United States Patent [19]
Ball et al.

[11] 3,949,177
[45] Apr. 6, 1976

[54] METHOD FOR FREQUENCY-RECOGNITION IN SELECTIVE SIGNAL RECEIVERS FOR USE IN TELECOMMUNICATION, PARTICULARLY TELEPHONE SYSTEMS

[75] Inventors: Herbert Ball, Stuttgart; Wolf Ohl, Korntal, both of Germany

[73] Assignee: International Standard Electric Corporation, New York, N.Y.

[22] Filed: Aug. 15, 1974

[21] Appl. No.: 497,707

[30] Foreign Application Priority Data
Aug. 16, 1973 Germany............................ 2341224

[52] U.S. Cl............................ 179/84 VF; 324/78 D
[51] Int. Cl.[2] ...................... H04M 1/50; H04Q 1/46
[58] Field of Search  179/84 VF; 340/171 R, 171 A, 340/171 PF; 324/78 D

[56] References Cited
UNITED STATES PATENTS
3,537,001  10/1970  Friend ............................ 179/84 VF
3,790,720   2/1974  Schartmann.................... 179/84 VF OTHER PUBLICATIONS
International Switching Symposium Record, June 1972, pp. 434–441, "Digital Multifrequency Tone Receiver" by S. G. Pitroda.

Primary Examiner—Kathleen H. Claffy
Assistant Examiner—Joseph Popek
Attorney, Agent, or Firm—J. B. Raden; D. P. Warner

[57] ABSTRACT

Selective digital signal receiver wherein the time distances between zero crossings of the input voltage are measured with a counter controlled at a clock frequency which is high compared with the signal frequency. The main check, covering a plurality of cycles and a predetermined bandwith, is always preceded by a pre-check, covering few cycles and a larger bandwidth. This allows early recognition of push-button dial signals.

6 Claims, 4 Drawing Figures

METHOD FOR FREQUENCY-RECOGNITION IN SELECTIVE SIGNAL RECEIVERS FOR USE IN TELECOMMUNICATION, PARTICULARLY TELEPHONE SYSTEMS

The present invention relates to a method for frequency recognition in selective signal receivers for use in telecommunication, particularly telephone systems, wherein the time distances between zero crossings of the input voltage are measured with a counter which is controlled at a clock frequency higher than the signal frequency to be determined, and wherein the input voltage is evaluated as a signal only if the measured value lies between a lower and an upper count determining the bandwidth.

Such signal receivers are disclosed in German printed application Nos. 2,145,886 and 2,156,123, for example. In these known signal receivers, the counter determines during each measurement the time distance between two adjacent zero crossings or between the zero crossings at the beginning and at the end of a single cycle of the input voltage. In addition to the signal frequencies, interfering signals frequently appear at the inputs of signal receivers. These interfering signals may shift the zero crossings of the input voltage to such an extent that the known digital signal receivers permit no safe signal recognition. It has therefore been proposed to use for each frequency-recognition operation several cycles of the input ac voltage and adapt the counter and its lower and upper counts to the extended measuring time.

In the case of signal receivers operating in this way, speech or music voltages may reach the input and may be followed by signal voltages peculiar to the system (e.g. push-botton signal voltages). If a code signal, i.e. a dc escort signal, is transmitted simultaneously with the push-button dial signal, the beginning of the push-button dial signal can be determined and, in response thereto, the frequency-recognition operation can be initiated. In systems operating without code signals, however, the beginning of the pushbutton dial signal cannot be recognized. In such systems it is possible that the signal-frequency recognition operation initiated in response to speech or music voltages continues beyond the beginning of the push-button dial signal and results in the determination that no push-button signal is present. Then, however, part of the duration of the push-button dial signal is already lost for the subsequent signal-frequency-recognition operation.

It is therefore the object of the present invention to provide a method of the kind referred to by way of introduction wherein the beginning of a signal peculiar to the system can be recognized as early as possible so that as much time as possible is available for the signal-frequency-recognition operation. The invention is characterized in that, for each signal-recognition operation, a plurality of cycles of the input voltage is used, that the counter and its lower and upper counts are adapted to the measuring time, which is determined by the plurality of cycles, and that said signal-recognition operation (main check) is not initiated until it has been determined in a pre-check measuring one or few cycles and covering a larger bandwidth that the input voltage may have a signal frequency.

When being turned on for delivering a signal, the signal generators need a certain transient response time for their frequency-determining circuits; filters which may precede the signal receivers require such a transient response time, too. An example of such filters are the group filters used in telephone systems with the push-button dialling technique operating with a two-group code. It may possible that with the known signal receivers or with the earlier proposed signal receiver, an adjacent and thus false signal is recognized during such transient response times. The present invention has the added advantage that such recognition of false signals is avoided if the duration of the cycles used for the pre-check corresponds to at least the aforementioned transient response time. If the transient response time should not yet be over before the beginning of the main check, it is proposed according to an improvement of the invention to perform at least one additional pre-check before the main check such that the additional pre-check is initiated only if the possible presence of a signal frequency is determined in the first pre-check, and that the main check is initiated only if the same is determined in the additional pre-check. To simplify the method, another embodiment of the invention is characterized in that the same devices are used for the main check and for the pre-check(s), and that for the main check, instead of the lower and upper counter outputs intended for the main check, only the lower and upper counter outputs intended for the main check are enabled.

The invention will now be explained in more detail with reference to the accompanying drawings, in which.

Figure 1:
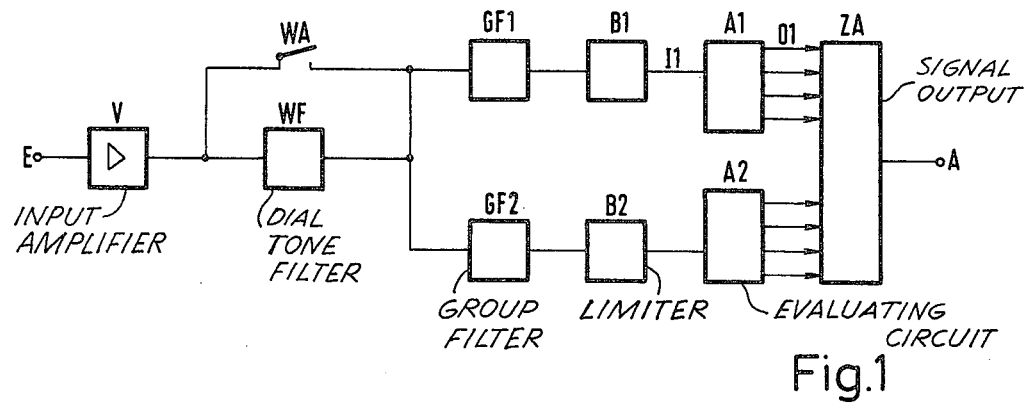
FIG. 1 is a block diagram of a signal receiver for a two-group code in accordance with the invention.

The signal receiver of FIG. 1 serves as a code dial signal receiver in telephone systems. During dialling, each dialled digit is formed by generating and transmitting two different frequencies one of which belongs to a first frequency group, while the second belongs to a second frequency group. The signal frequencies of the first frequency group may have the values 697, 770, 852, and 941 Hz, for example, while the second frequency group may consist of the frequencies 1,209, 1,336, 1,477, and 1,633 Hz. The two-frequency signals are generated in the subscriber sets by means of signal generators. Because of the signal-generator tolerances, the signal frequency lies within a range of $f_o \pm f_o/2$.

The signal received at the input E is first amplified in an input amplifier V, then passed when the switch WA is open as shown through a dial-tone filter WF, and subsequently applied to the group filters GF1, GF2 where its two frequency groups are separated. If the received signal is composed of two code dial frequencies, the separation of the two frequencies is effected by means of these group filters. Each of the signal voltages associated with these frequencies is used to control a limiter B1, B2, which converts the sinusoidal signal voltage to a square-wave voltage. One square-wave voltage is applied (via one input I1) to an evaluating circuit A1, and the other square-wave voltage is fed to an evaluating circuit A2. The evaluating circuits determine whether the frequency of the received signal lies within predetermined ranges allotted to the code dial frequencies. The result of the evaluating circuit is transferred via the four outputs (O1) of each evaluating circuit A1, A2 to a signal output circuit ZA which checks whether a signal frequency is present in each frequency group. If that is the case, the code signal is delivered via the output A.

Figure 2:
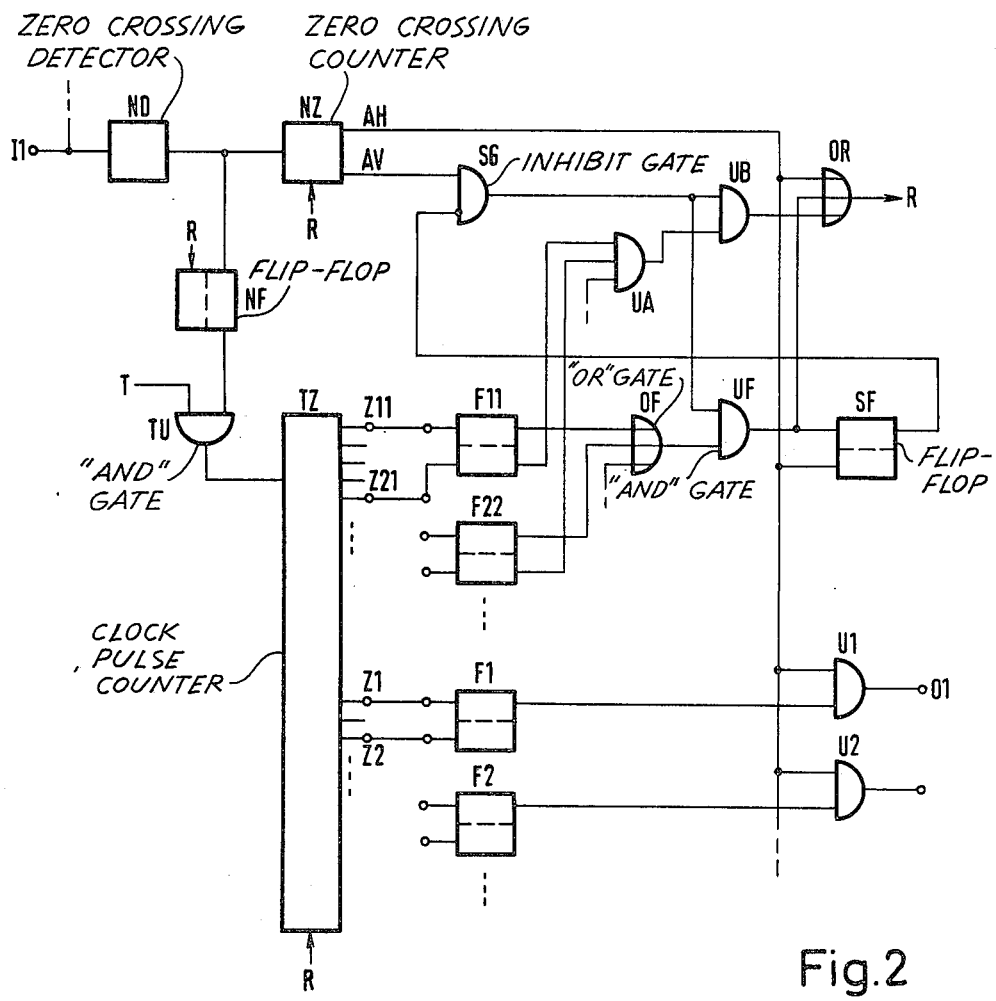
FIG. 2 is a schematic diagram of a portion of an evaluating circuit as shown in FIG. 1 which portion is essential to the invention.

FIG. 2 shows a schematic diagram of a portion of an evaluating circuit, e.g. of the evaluating circuit A1 of FIG. 1. The square-wave voltage is fed through the input I1, to which additional circuits for improving speech immunity (not shown) are connected, to a zero-crossing detector ND which delivers a spike each time the square-wave voltage passes through zero. These spikes are counted by a zero-crossing counter NZ whose counting volume is adjustable. The zero-crossing counter NZ has two outputs AV, AH. The output AV corresponds to a relatively low count, e.g. to the count 6, while the output AH corresponds to a relatively high final count, e.g. to the final count 32. When the selected final count of the zero-crossing counter NZ is reached, the latter provides a reset pulse R and resets itself and other circuits at the reset inputs R.

The first spike of the zero-crossing detector ND also sets a flip-flop NF, which then opens an AND-circuit TU for the passage of clock pulses arriving at the input T. The clock pulses, coming from a clock generator (not shown), have a relatively high frequency as compared to the signal frequencies to be determined and are counted by a clock-pulse counter TZ until resetting is effected by the zero-crossing counter NZ via one of its outputs AV, AH. The clock-pulse counter TZ has a number of outputs. For each code signal frequency a lower count and an upper count can be tapped. It is assumed, for example, that an output Z11 allotted to one lower count and an output Z21 allotted to the associated upper count are provided for the frequency $f_1$. The output Z11 is connected to the set input of a flip-flop F11 whose reset input is connected to the output Z21. Analogously, a flip-flop F22 allotted to the frequency $f_2$ and two additional flip-flops (not shown) are connected to associated outputs of the clock-pulse counter TZ. The outputs of these flip-flops are connected via on OR-circuit OF to one input of an AND-circuit UF, whose other input is connected to the output of an inhibit gate SG. The output of the AND-circuit UF is connected, on the one hand, to one input of an OR-circuit OR and, on the other hand, to the set input of a flip-flop SF. The output of this flip-flop, which produces a "1" signal after setting, is connected to the inhibit input of the inhibit gate SG, whose set input is connected to the output AV of the zero-crossing counter NZ.

The outputs of the flip-flops F11, F22, which produce "1" signals after resetting, are connected via an AND-circuit UA to one input of an AND-circuit UB, whose other input is connected to the output of the inhibit gate SG.

Furthermore, it is assumed, for example, that an output Z1 allotted to the other lower count and an output Z2 allotted to the associated upper count are provided for the frequency $f_1$. The output Z1 is connected to the set input of a flip-flop F1, whose reset input is connected to the output Z2. Analogously, a flip-flop F2 allotted to the frequency $f_2$ and two additional flip-flops (not shown) are connected to associated outputs of the clock-pulse counter TZ. The outputs of these flip-flops are connected, respectively, to one of the inputs of individually associated AND-circuits U1, U2, etc. The other inputs of these AND-circuits, the reset input of the flip-flop SF and one input of the OR-circuit OR are connected to the output AH of the zero-crossing counter NZ. The outputs of these AND-circuits are connected to the signal output circuit as is indicated by the output O1 of the AND-circuit U1 in FIGS. 1 and 2.

At the appearance of an input signal at the input I1 a pre-check is always performed with the flip-flops F1, F22 . . . before the main check, i.e. the actual frequency-recognition operation, can be carried out with the flip-flops F1, F2 . . . . For example, the flip-flop F11 is changed to the "on" state if the value counted during the time between the setting of the flip-flop NF and the appearance of a signal at the output AV of the zero-crossing counter NZ, which time comprises only few cycles, lies between the values Z11 and Z21. In this case, the flip-flop F11 sets, via the circuits OF, UF, the flip-flop SF, which subsequently inhibits the inhibit gate SG. At the same time, the flip-flop F11 causes the zero-crossing counter NZ, the flip-flop NF, the clock-pulse counter TZ, and the flip-flop F11 to be reset via the circuits OF, UF, OR (the resetting of the flip-flop F11 is not shown). Following the next input-voltage zero crossing occurring at the input I1, the counters NZ, TZ begin to count anew, with the zero-crossing counter NZ counting on beyond its count AV because no resetting can be effected via the inhibited inhibit gate SG. If the value counted during the time between the setting of the flip-flop NF and the appearance of a signal at the output AH of the zero-crossing counter NZ lies between the values Z1 and Z2, the flip-flop F1 is in its "on" state. Then, as an indication that the frequency $f_1$ has been determined, an output signal is provided via the output O1 when the final count AH of the zero-crossing counter NZ has been reached. This main check covers a plurality of cycles of the ac voltage applied to the input I1. The number of cycles for the pre-check and the main check are predetermined by the selection of the intermediate count AV and of the final count AH of the zero-crossing counter NZ. The lower count Z11, Z1 and the upper count Z21, Z2 as well as the analogous counts for the other frequencies are chosen depending on the predetermined number of cycles, on the predetermined tolerances of the signal frequencies, and on permissible interference-voltage components.

The effect of an interference voltage on the signal voltage at the input E (FIG. 1) will be apparent from the following. An interference voltage $U_S$ influences a signal voltage $U_Z$ in such a manner that zero crossings of the sum voltage $U_Z + U_S$ are shifted with respect to zero crossings of the signal voltage $U_Z$ by the angle $\alpha$. The maximum shaft is:

$$\sin \alpha_{max} = \frac{\hat{U}_S}{\hat{U}_Z}$$

If each measurement covers a plurality of cycles, the absolute error turns out to be constant at 2 $\alpha_{max}$, while the relative error decreases as a function of the number of cycles and is:

$$F_{jmax} = \frac{2\alpha_{max}}{180 \cdot p_H}$$

For the limit values of the bandwidth:

$$f_{e1} = \left(f_o + \frac{\Delta f_o}{2}\right)\left(1 + \frac{2\alpha_{max}}{180 \cdot p_H}\right)$$

$$f_{e2} = \left(f_o - \frac{\Delta f_o}{2}\right)\left(1 - \frac{2\alpha_{max}}{180 \cdot p_H}\right)$$

where $f_o$ is the nominal signal frequency, $\Delta f_o$ is the permissible frequency-variation range related to the nominal signal frequency and essentially dependent by the permissible tolerance of the signal-frequency generators, $\alpha_{max}$ is the zero shift angle, and $p_H$ is the number of half cycles of the input voltage to be measured.

Figure 3:
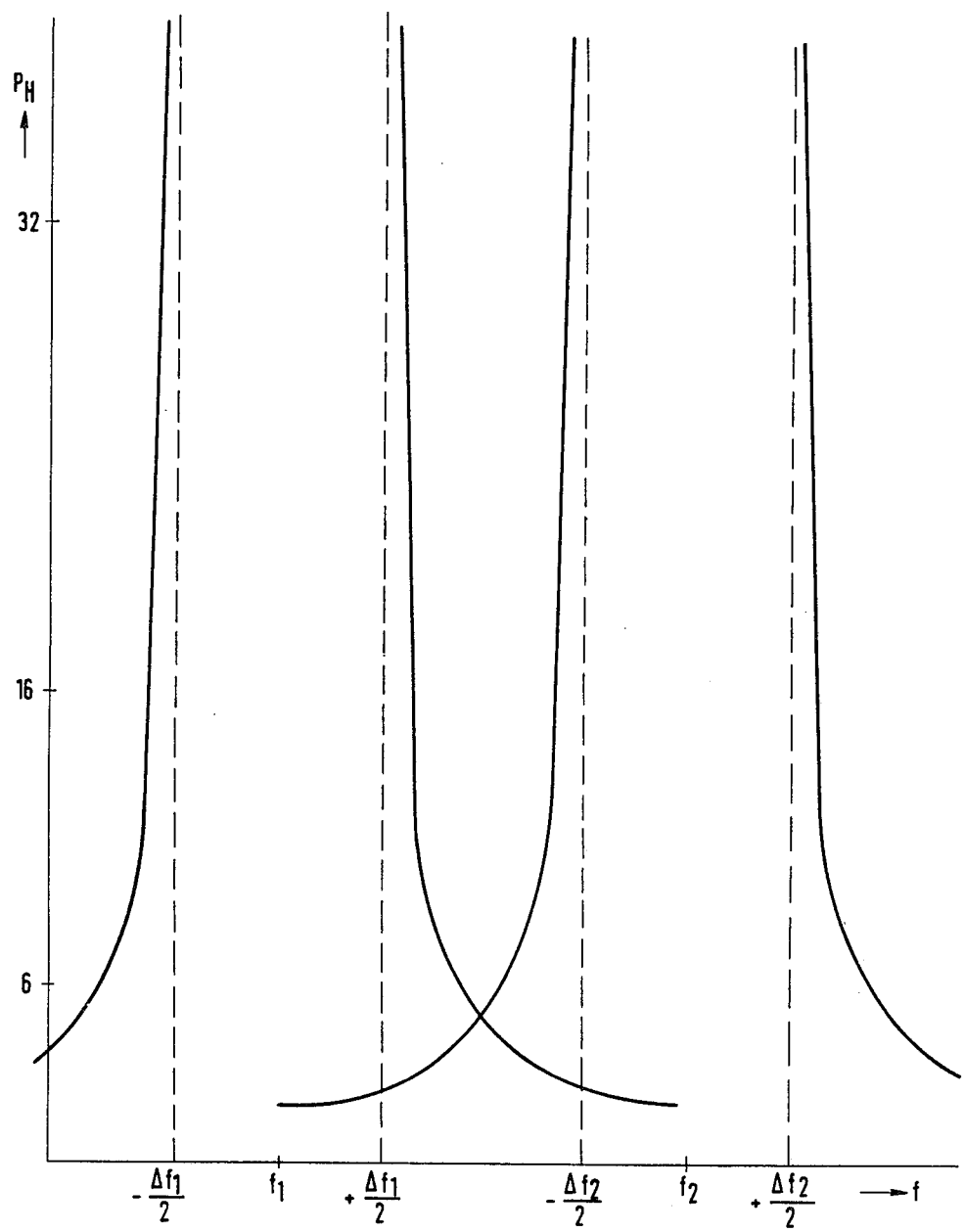
FIG. 3 is a diagram which gives the bandwidth of the signal receiver as a function of the number of half cycles measured.

FIG. 3 shows the bandwidth curves of two adjacent signal frequencies as a function of the number of half cycles $p_H$ per measurement, with predetermined values for $f_o$, $\Delta f_o$ and $\alpha_{max}$ taken as a basis. If, for example, the signal frequencies $f_1 = 697$ Hz and $f_2 = 770$ Hz are the adjacent signal frequencies, $\Delta f_1$ and $\Delta f_2$ are chosen to be $1.8 \cdot 10^{-2} F_1$ and $1.8 \cdot 10^{-2} f_2$, respectively, and, assuming a typical signal-to-noise ratio of 12 db so that $$\alpha_{max} = \arcsin \hat{U}_S/\hat{U}_Z = \arcsin \tfrac{1}{4} = 14.5°,$$

it will be apparent from FIG. 3 that, if only six half cycles per measurement are taken as a basis, a bandwidth sufficient for frequency determination is achieved. If the number of half cycles increases, a smaller bandwidth can be achieved and/or a smaller signal-to-noise ratio can be permitted; on the other hand, the distance between the adjacent frequencies $f_1$, $f_2$ could be reduced as well.

With the pre-check, which covers only few cycles of the input voltage and a larger bandwidth (Z11 – Z21) it can therefore be determined according to FIG. 2 that the input voltage may have a signal frequency, whereupon the main check is initiated.

If, however, none of the flip-flops F11, F22 . . . has been set at the end of the few cycles of the input voltage and of the simultaneously effected marking of the output AV, the AND-circuit UA responds, so that the counters NZ, TZ and the flip-flop NF are reset via the circuits UB, OR and thus a new pre-checking operation NF is initiated. These circuits are also reset if none of the flip-flops F1, F2 . . . is in the "on" state during the main check, with resetting being effected by the signal appearing at the output AH and passed through the OR-circuit OR.

FIG. 2 also shows that the same circuits ND, NZ, NF, TZ are used for the main check and for the pre-check, and that for the main check, instead of the lower and upper outputs Z11, Z21 of the clock-pulse counter TZ, which are used for the pre-check, the lower and upper counter outputs Z1, Z2 used for the main check are enabled. The other counter outputs (partly not shown) are enabled in the same manner.

Figure 4:
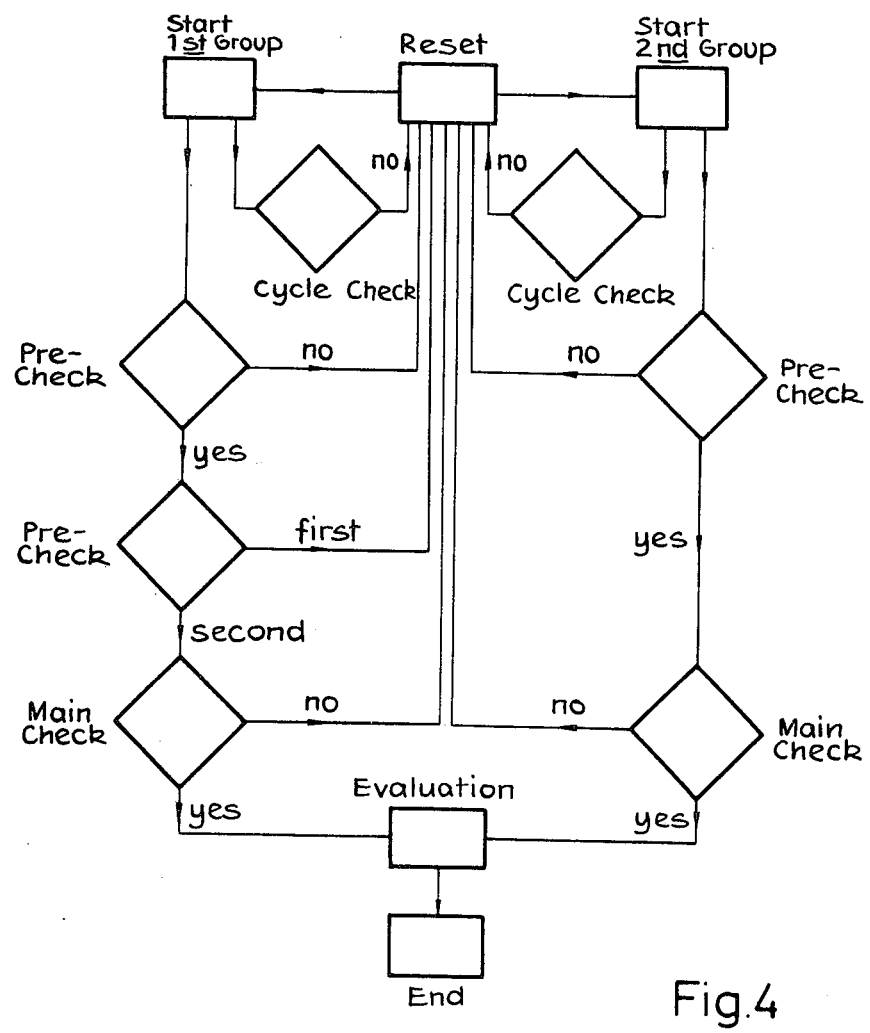
FIG. 4 shows schematically a sequence of operations in a selective signal receiver operating with two pre-checks.

Analogously to the representation of FIG. 2, the main check may be preceded by at least one more pre-check. The sequence of operations of the associated control is shown in FIG. 4, which applies to both signal-frequency groups.

If no signal frequencies were determined in the first pre-check, the counters in the evaluating circuits A1 and A2 (FIG. 1) are reset in the same manner as in the arrangement of FIG. 2, the resetting being caused by either the evaluating circuit A1 or the evaluating circuit A2. If, however, a signal frequency has been determined during the first pre-check, a marking is set which indicates that a first pre-check has been positive, and the counters are reset to allow the second pre-checking operation to begin. If the second pre-checking operation determines again that the frequency may be a signal frequency, this outcome, together with the marking set, results in the counter being able to advance and thus in the main check being performed. The outcome of the second pre-check is also used to change those of the flip-flops F1 to F4 to the "off" state which are not allotted to the recognized signal frequency.

The outputs of the counter TZ are so wired that between the outputs Z1 and Z2, for example, a narrower frequency band is evaluated than between outputs Z11 and Z21.

For reasons of speech immunity, there may be a parallel cycle check as indicated at the input I1 of FIG. 2.

The second pre-check may be performed in order to cover the transient response times of the signal generators and of the group filters.

What is claimed is:

1. A method for frequency recognition in selective signal receivers for use in telecommunication, and particularly in telephone systems, wherein the zero crossings of the input voltage are represented as pulses, the pulses are measured at a clock frequency higher than the signal frequency to be determined, and the input voltage is evaluated as a signal only if the measured value of said pulses lies between a lower and an upper count determining the bandwidth, wherein the improvement comprises, for each signal-recognition operation, making a pre-check measurement of one or a few pulses to determine whether the input voltage includes a signal frequency, recommencing consideration of incoming signals when no signal frequency is detected, and when a signal frequency is located, making a main check measurement of a larger number of pulses to more accurately identify said signal frequency.

2. A method according to claim 1, in which the main check measurement is preceded by at least one additional pre-check measurement such that the additional pre-check measurement is initiated only if the possible presence of a signal frequency is determined during the first pre-check measurement, and the main check measurement is initiated only if the same is determined during the additional pre-check measurement.

3. A selective signal receiver for use in telecommunication and particularly in telephone systems, wherein the time distances between zero crossings of an input voltage are measured with a counter which is controlled at a clock frequency higher than the signal frequency to be determined, and wherein the input voltage is evaluated as a signal only if the measured value lies between a lower and an upper count determining the bandwidth, wherein the improvement comprises means coupled to a counter for taking a pre-check measurement of one or a few pulses to determine whether the input voltage includes a selected signal frequency or not, means coupled to provide signals to recommence consideration of incoming signals when no signal frequency is detected, and means responsive when a signal frequency is located for making a main check measurement of a larger number of pulses to more accurately identify said signal frequency.

4. The invention according to claim 3, in which means are provided by which the main check measurement is preceded by at least one additional pre-check measurement such that the additional pre-check measurement is initiated only if the possible presence of a signal frequency is determined during the first pre-check measurement, and the main check measurement is initiated only if the same is determined during the additional pre-check measurement.

5. The invention according to claim 3, in which the same means are used for the main check measurement and for the pre-check measurement.

6. The invention according to claim 3, in which the same means are used for the main check measurement and for each of the pre-check measurements.

* * * * *